United States Patent
Sauer

(10) Patent No.: US 12,393,413 B1
(45) Date of Patent: Aug. 19, 2025

(54) AUTOMATED DEPLOYMENT AND MANAGEMENT OF CONTAINERIZED APPLICATION ENVIRONMENTS USING A GRAPHICAL USER INTERFACE AND METADATA-DRIVEN TEMPLATING

(71) Applicant: Stacktic AG, Zurich (CH)

(72) Inventor: Assaf Sauer, Zurich (CH)

(73) Assignee: Stacktic AG, Zurich (CH)

( * ) Notice: Subject to any disclaimer, the term of this patent is extended or adjusted under 35 U.S.C. 154(b) by 5 days.

(21) Appl. No.: 18/759,900

(22) Filed: Jun. 30, 2024

(51) Int. Cl.
| | |
|---|---|
| G06F 8/60 | (2018.01) |
| G06F 8/61 | (2018.01) |
| G06F 8/77 | (2018.01) |
| G06F 9/54 | (2006.01) |
| G06N 20/00 | (2019.01) |

(52) U.S. Cl.
CPC ..................... G06F 8/61 (2013.01)

(58) Field of Classification Search
CPC ........................................................ G06F 8/60
See application file for complete search history.

(56) References Cited

U.S. PATENT DOCUMENTS

| | | | |
|---|---|---|---|
| 11,403,558 B1 * | 8/2022 | Shorter | G06N 3/08 |
| 2018/0225095 A1 * | 8/2018 | Kamalakantha | G06F 15/16 |
| 2022/0043641 A1 * | 2/2022 | Nagar | H04L 63/08 |

* cited by examiner

*Primary Examiner* — S. Sough
*Assistant Examiner* — Mohammad H Kabir

(57) ABSTRACT

A system for deploying a containerized applications environment, comprising a storage with application stack templates and mapping data of application integration topology, and processors configured to: display a graphical user interface; generate a logical graph defining data flow between applications based on user actions and mapping data; select a subgroup of stack templates; convert the logical graph into a metadata dataset with application parameters; modify template variables with respective parameters; combine the subgroup to generate a containerized applications environment repository; and output the repository for code production deployment.

19 Claims, 8 Drawing Sheets

Attributes  171

| Technical ID | Label | Group | Type | Index | Owner | Actions |
|---|---|---|---|---|---|---|
| access_key | Access Key | configuration | text | 11 | stacktic | |
| acme_url | Generic ACME URL | configuration | text | 1 | stacktic | |
| admin_password | Admin password | configuration | text | 10 | stacktic | |
| authorization | Authorization | configuration | text | 44 | stacktic | |
| bucket | Bucket | configuration | text | 1 | stacktic | |
| ca_crt | CA Cert | configuration | textarea | 1 | stacktic | |
| cassandra_keyspace | Keyspace | configuration | text | 1 | stacktic | |
| cassandra_port | Service Port | configuration | text | 1 | stacktic | |
| collector_name | Collection | configuration | text | 103 | stacktic | |
| cors | CORS enabled | configuration | toggle | 130 | stacktic | |
| cruisecontrol | Cruise-Control | configuration | toggle | 0 | stacktic | |
| database | Database | configuration | text | 100 | stacktic | |
| datacenter | Datacenter | configuration | text | 1 | stacktic | |
| email_contact | Email contact | configuration | text | 3 | stacktic | |
| git_folder | Git Folder | configuration | text | 138 | stacktic | |
| git_full_path | Git Full Path | configuration | text | 134 | stacktic | |
| git_url | Git URL | configuration | text | 137 | stacktic | |
| gitops | Gitops enabled | configuration | toggle | 23 | stacktic | |
| http_path_GET | GET endpoint | configuration | text | 121 | stacktic | |
| http_path_POST | POST endpoint | configuration | text | 122 | stacktic | |
| influxdb | InfluxDB Query | configuration | textarea | 1 | stacktic | |

FIG. 2A

Components  170

| Technical ID | Label | Group | Owner | Actions |
|---|---|---|---|---|
| argo_cd | Argo CD | cicd | stacktic | |
| argo_workflows | Argo Workflows | cicd | stacktic | |
| cassandra | Cassandra | broker | stacktic | |
| cert_manager | Cert-Manager | platform | stacktic | |
| external_source_code | External Source Code | backend | stacktic | |
| grafana | Grafana | dataviz | stacktic | |
| istio | Istio | mesh | stacktic | |
| istio_gateway | Istio Gateway | mesh | stacktic | |
| istio_migration | Istio Migration | mesh | stacktic | |
| jupyterhub | Jupyter Hub | broker | stacktic | |
| k6 | k6 | performance | stacktic | |
| keda | KEDA | platform | stacktic | |
| keycloak | Keycloak | authentication | stacktic | |
| kong | Kong | gateway | stacktic | |
| loki | Loki | logs | stacktic | |
| minio | Minio | storage | stacktic | |
| mongodb | MongoDB | doc_db | stacktic | |
| nodejs | Node.js | backend | stacktic | |
| opa | Open Policy Agent | platform | stacktic | |
| postgresql | PostgreSQL | rel_db | stacktic | |
| prometheus | Prometheus | temporal_db | stacktic | |

FIG. 2B

AUTOMATED DEPLOYMENT AND MANAGEMENT OF CONTAINERIZED APPLICATION ENVIRONMENTS USING A GRAPHICAL USER INTERFACE AND METADATA-DRIVEN TEMPLATING

FIELD AND BACKGROUND OF THE INVENTION

The present invention relates to the field of software development and deployment, particularly to systems and methods for automating the deployment of containerized application environments.

Recently, containerization technologies like Docker have gained popularity for deploying lightweight, portable applications. While these technologies simplify package deployment, scaling and managing containers, especially in large environments, remains challenging. Existing tools, such as Kubernetes and Docker Compose, while powerful, demand extensive technical knowledge and manual configuration, posing barriers for many organizations.

Deploying a containerized application environment typically involves defining the application stack, which includes the various components, services, and dependencies required by the application. This process often requires significant manual effort, including writing configuration files, defining deployment parameters, and creating scripts to automate the build, test, and deployment processes.

Moreover, modern application environments often consist of multiple interconnected applications, each with its own set of dependencies and configurations. Managing the relationships and data flows between these applications can be challenging, particularly as the complexity of the environment grows.

Existing solutions for deploying containerized applications, such as Kubernetes and Docker Compose, provide powerful tools for managing containers and their dependencies. However, these tools often require significant technical expertise and manual configuration, which can be a barrier to entry for many organizations.

SUMMARY OF THE INVENTION

The embodiments of the present invention provide a system and method for automating the deployment of containerized application environments. The system comprises a storage component that stores application stack templates and mapping data, and one or more processors that generate a logical graph representing the relationships and dependencies between applications based on user inputs through a graphical user interface. These methods and systems may simplify the management of complex application environments, making advanced containerization accessible without extensive technical expertise. When user generates a logical graph, in addition to the topology deployment he or she may automate processes of development such as CI/CD or security. These methods and systems are automating full lifecycle from deployment, processes and/or logic as described herein.

The graphical user interface allows users to visually design and manage their application stacks by dragging and dropping components, defining relationships, and specifying configuration parameters. The system converts the logical graph into a metadata dataset that includes application-specific configurations, deployment settings, and dependencies.

The processors then select a subgroup of application stack templates based on the applications in the logical graph and modify the variables in these templates using the metadata dataset. The modified templates are combined to generate a comprehensive containerized applications environment repository that includes all the necessary configurations, deployment files, scripts, and artifacts for deploying the application stack.

The system supports the inclusion of user-defined components, links, attributes, and templates, allowing for extensive customization and extensibility. It also provides features for generating configuration files, deployment files, and applying user-defined security policies.

The embodiments of the present invention differ from existing solutions by providing a more user-friendly, automated, and integrated approach to containerized application deployment. It abstracts away the complexities of container orchestration and provides a visual and intuitive interface for designing and managing application stacks. The system's extensibility, customization capabilities, and advanced features, such as monitoring and alerting, CI/CD pipeline integration, scaling policies, backup and disaster recovery, and network policies, set it apart from existing solutions.

The method for deploying a containerized applications environment involves storing application stack templates and mapping data, displaying a graphical user interface, generating a logical graph based on user actions, selecting a subgroup of templates, converting the logical graph into a metadata dataset, modifying template variables, combining the modified templates into a repository, and outputting the repository for deployment.

The embodiments of the present invention offer significant advantages over existing solutions in terms of ease of use, efficiency, and reliability. It reduces the learning curve, automates manual tasks, and ensures consistency and reproducibility in the deployment process. The invention provides a powerful and flexible tool for organizations to deploy and manage their containerized applications environment, tailored to their specific needs and requirements.

In summary, the embodiments of the present invention revolutionize the way containerized application environments are deployed and managed by providing a user-friendly, automated, and integrated system and method. It empowers organizations to streamline their application deployment process, reduce complexity, and improve the overall efficiency and reliability of their containerized applications environment.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system.

In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-2C are screenshots of graphical user interfaces for adding user defined attributes and components, according to some embodiments of the present invention;

FIG. 2C is a screenshot of graphical user interface for defining a user defined application stack template, according to some embodiments of the present invention;

DESCRIPTION OF SPECIFIC EMBODIMENTS OF THE INVENTION

Figure 1:
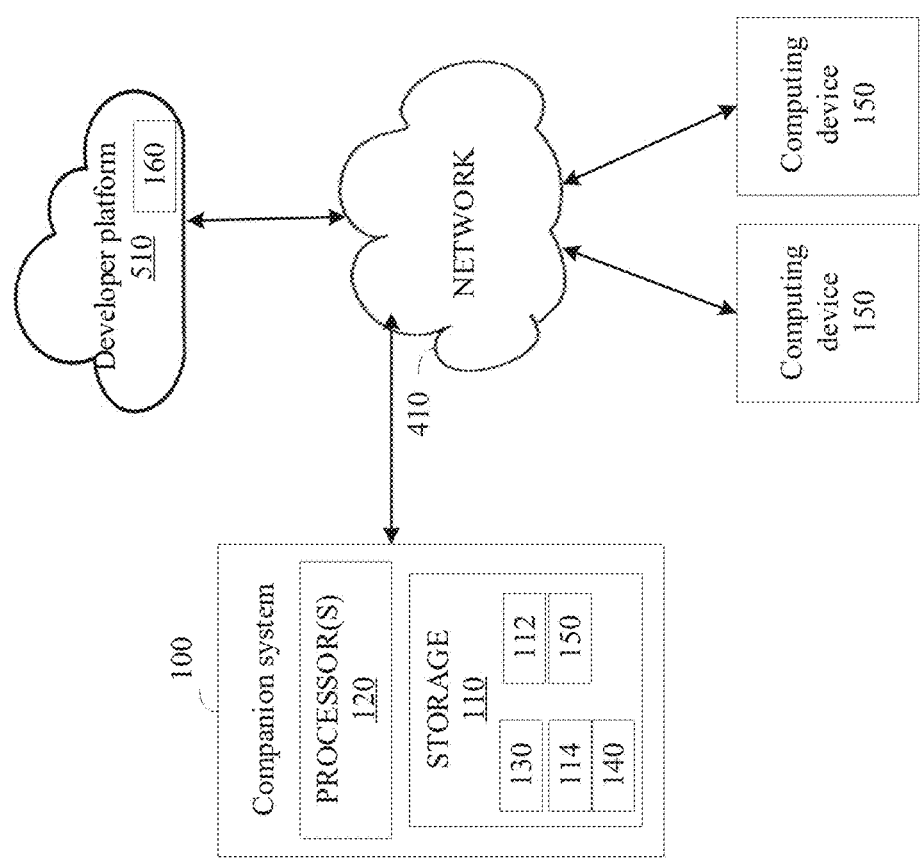
FIG. 1 illustrates a system (100) for generating and managing a containerized applications environment, according to some embodiments of the present invention.

The present invention relates to the field of software development and deployment, particularly to systems and methods for automating the deployment of containerized application environments.

To address challenges including the challenges provided in the above background section, herein described a system that can automate the deployment of containerized application environments, while also providing a user-friendly interface for defining and managing the relationships between applications. Such a system would enable organizations to quickly and easily deploy complex application environments, without requiring extensive technical expertise.

The embodiments of the present invention provide a novel solution to these challenges by introducing a system and method for deploying containerized application environments using a combination of application stack templates, mapping data, and a graphical user interface. By allowing users to define the relationships between applications using a visual interface, and automatically generating the necessary configuration files and deployment scripts, the invention streamlines the process of deploying complex application environments.

The embodiments described herein represents a significant advancement in the field of software development and deployment, by providing a user-friendly and automated solution for deploying containerized application environments. The invention has the potential to greatly simplify the process of managing complex application environments, while also reducing the time and effort required for deployment.

The system described herein differs from existing solutions in the field of containerized application deployment and management in several key aspects, offering specific advantages and improvements over these solutions. Existing solutions, such as Kubernetes and Docker Compose, provide powerful tools for managing containers and their dependencies. However, they often require significant technical expertise and manual configuration to set up and manage containerized application environments. Users need to write complex configuration files, define resource dependencies, and manually orchestrate the deployment process. This can be time-consuming and error-prone, especially for users who are not familiar with the intricacies of containerization technologies.

In contrast, the present invention offers a more user-friendly and automated approach to containerized application deployment. It provides a graphical user interface that allows users to define and manage their application stacks visually, without requiring deep technical knowledge. Users can drag and drop components, define relationships and dependencies, and specify configuration parameters through intuitive visual tools. This abstraction layer (e.g., metadata dataset and used templates) simplifies the process of designing and deploying containerized applications, making it accessible to a wider range of users. Moreover, existing solutions often focus on the low-level details of container orchestration and management, leaving the higher-level aspects of application deployment, such as environment-specific configurations, scaling policies, and monitoring, to be handled separately. This fragmentation can lead to complexity and inconsistency in the overall application deployment process.

Embodiments of the present invention addresses this challenge by providing a holistic and integrated approach to containerized application deployment. It combines the power of application stack templates, mapping data, and a graphical user interface to automate the entire deployment process, from application design to runtime management. The system generates a comprehensive containerized applications environment repository that includes not only the container configurations but also the necessary deployment files, scripts, and artifacts. This integrated approach ensures consistency and reproducibility across different environments and reduces the chances of errors or misconfigurations.

Another advantage of the embodiments of the present invention is its extensibility and customization capabilities. Existing solutions often provide a fixed set of templates or configurations that may not fit the specific requirements of an organization or application. In contrast, the present invention allows users to define their own application stack templates, components, and configurations through the graphical user interface. Users can create custom templates, define application-specific parameters, and include additional scripts or artifacts as needed. This flexibility enables organizations to tailor the deployment process to their specific needs and integrate it seamlessly with their existing tools and workflows.

Furthermore, the present invention offers advanced features and capabilities that go beyond the basic containerization and orchestration provided by existing solutions. It includes built-in support for monitoring and alerting, allowing users to define performance thresholds and receive notifications when issues arise. It also provides options for integrating with CI/CD pipelines, enabling automated building, testing, and deployment of applications. Additionally, the invention supports the definition of scaling policies, backup and disaster recovery procedures, and network policies, providing a comprehensive set of tools for managing and optimizing the containerized applications environment.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a system (100) for generating and managing a containerized applications environment, according to some embodiments of the present invention. The system comprises a storage (110), one or more processors (120), and code for rendering a graphical user interface (from a code (130)) on a client device (150) used for allowing a user to provide instructions for forming and optionally deploying the containerized applications environment.

The storage (110) comprises a plurality of application stack templates and mapping data. The application stack templates (112) define the components, services, and dependencies required by each application in the environment.

The mapping data (114) defines the application integration topology, which includes the relationships and data flows between the applications.

The one or more processors (120) are configured to perform various functions. Firstly, they instruct the display of the graphical user interface (130). The graphical user interface (130) allows users to define the relationships between applications and specify various parameters and configurations for example as further described below.

Figure 2C:
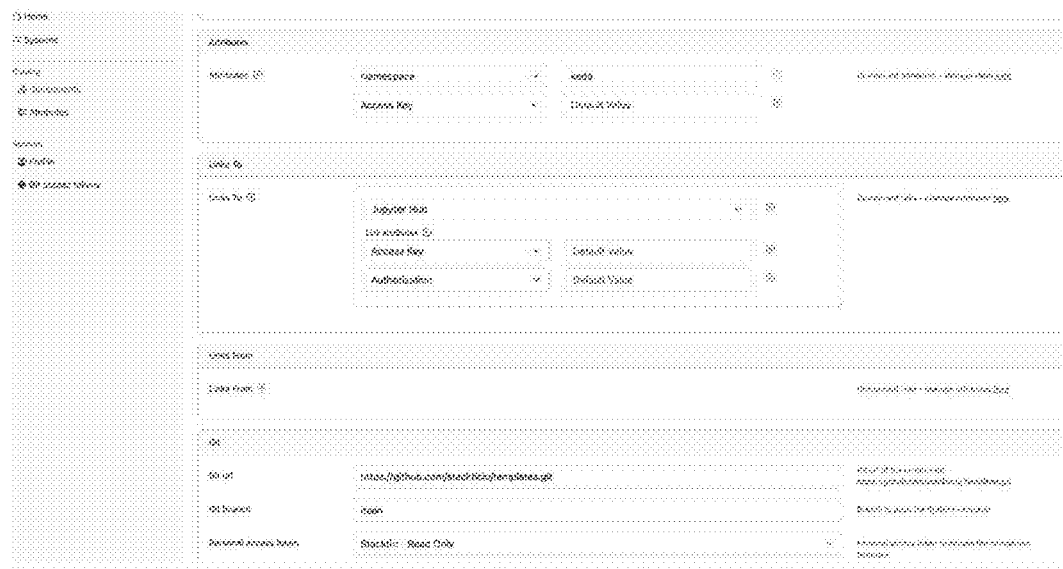
Figure 2D:
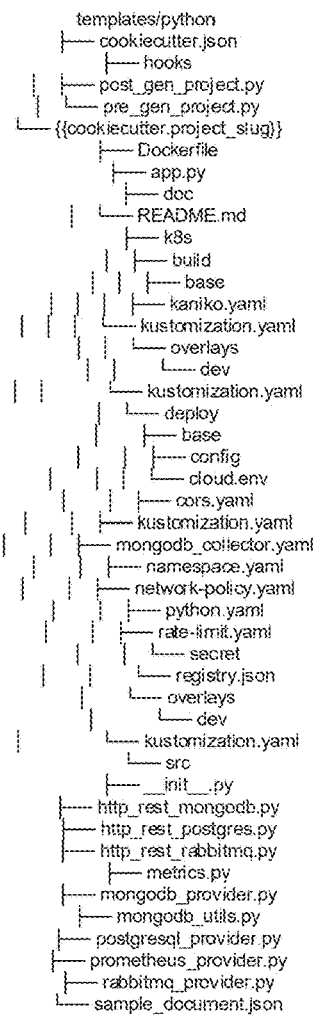
FIG. 2D is an example of an application stack template formed as a Cookie cutter template, according to some embodiments of the present invention.
Figure 2E:
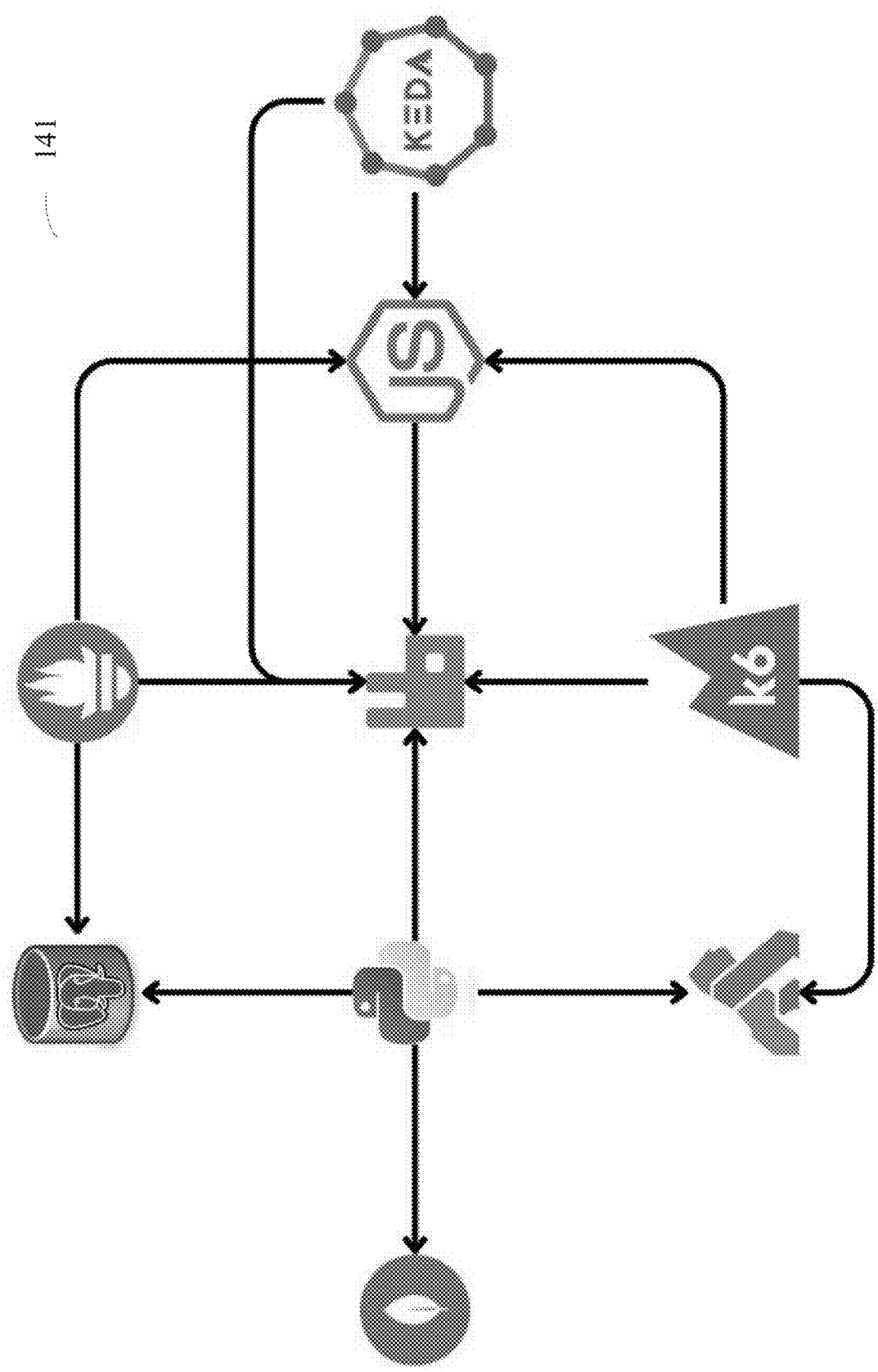
FIG. 2E is an illustration of a logical graph defining a data flow between a plurality of applications, according to some embodiments of the present invention.

Based on user actions performed on the graphical user interface (130) and the mapping data (114), the processors (120) generate a logical graph, for example as depicted in FIG. 2E. The logical graph defines the data flow between the applications, based on the user-defined relationships and the integration topology specified in the mapping data. For example, see FIG. 2E which schematically depicts a logical graph defining data flow between different applications.

The processors (120) then select a subgroup of one or more of the application stack templates (112) based on the applications included in the logical graph (140). This subgroup represents the specific components, services, and dependencies required by the applications in the environment, for example as described below.

Next, the processors (120) convert the logical graph (140) into a metadata dataset (150). The metadata dataset (150) comprises application parameters for each of the applications in the environment. These parameters may include configuration settings, deployment options, and other relevant information. As the metadata dataset (150) is accessible for modifying or defining stacks of various applications, making the generation of a common environment for these application possible as described below.

The processors (120) then modify the variables of one or more members of the subgroup of application stack templates (112) with the respective application parameters from the metadata dataset (150). This process customizes the application stack templates (112) to match the specific requirements of the applications in the environment.

The above allows the processors (120) to combine the modified application stack templates (112) to generate a containerized applications environment repository (160), for instance for storing in a developer platform (510) such as GitHub™. This repository (160) contains all the necessary configuration files, deployment scripts, and other artifacts required to deploy the application environment.

The system may now output the containerized applications environment repository (160) for code production deployment. This repository (160) can be used to deploy the application environment to a production system, such as a cloud platform or a container orchestration system like Kubernetes.

The metadata dataset (150) generated from the logical graph (140) contains detailed information about each application in the stack, including configuration settings, deployment parameters, environment variables, and dependencies. This metadata is used to customize the application stack templates (112) to create a fully-configured containerized applications environment repository (160). The modification process involves iterating through each template in the selected subgroup and replacing placeholders or variables with the corresponding values from the metadata dataset. For example, a template might have a placeholder for the application's port number, such as "{{APP_PORT}}". The system will look up the port number for that specific application in the metadata dataset and replace the placeholder with the actual value. This process is repeated for all variables in the template, including more complex structures like lists or dictionaries. The system ensures that the correct data type and format are used when substituting the values. In some cases, the metadata might include conditional logic that determines whether certain sections of the template should be included or excluded. For example, if an application requires a specific security configuration only when deployed in a production environment, the template could use a conditional block. The system will evaluate these conditions using the metadata and include or exclude the relevant sections accordingly.

By modifying the stack templates in this way, the system can automatically generate a complete, custom-tailored configuration for each application in the stack, without requiring manual intervention. This saves significant time and effort compared to manually editing each template and ensures consistency across the entire application stack. Once all templates have been processed and modified, they are combined into a single containerized applications environment repository (160), along with any additional files needed for deployment, such as Docker files, Kubernetes manifests, or CI/CD scripts. This repository contains everything needed to deploy the application stack in a containerized environment, fully configured according to the user's specifications in the graphical interface.

The system and its components described in the present invention can be implemented as a Software as a Service (SaaS) offering. In a SaaS implementation, the system would be hosted and managed by a service provider, and accessed by users over the internet using a web browser or other client application. In a SaaS implementation of the present invention, the various components of the system, such as the storage (110), processors (120), and graphical user interface (130), would be deployed and managed by the service provider in a cloud computing environment. The service provider would be responsible for provisioning and scaling the necessary computing resources, such as servers, storage, and networking, to support the system and its users. Users of the SaaS implementation would access the system through a web-based graphical user interface (130) executed on a client device (150), which would allow them to view, manipulate, and configure the various components of their containerized applications environment. The GUI would be hosted and served by the service provider, and accessed by users using a web browser or other client application. The application stack templates (112), mapping data (114), and user-defined components (170) would be stored and managed by the service provider in a centralized storage system (110), such as a cloud-based object storage service or database. The service provider would be responsible for ensuring the security, availability, and durability of this data, and for providing tools and APIs for users to access and manage their data. The processors (120) that generate the logical graph (140), select and modify the application stack templates (112), and generate the metadata dataset (150) and containerized applications environment repository (160) would be implemented as cloud-based services, such as serverless functions or container-based microservices. These services would be managed and scaled by the service provider, and accessed by users through APIs or other programmatic interfaces.

The system 100 can be used for automating the process of generating a containerized application environment ready for deployment. By using a combination of application stack templates (112), mapping data (114), and a graphical user interface (130), the system allows users to easily define the relationships between applications and generate a fully-configured environment repository (160) for deployment. This streamlines the process of deploying complex application environments and reduces the need for manual configuration and scripting.

As indicated above, the storage stores application stack templates (112). The application stack templates (112) are optionally pre-configured templates that define the components, services, and dependencies required to run a specific application or service within a containerized environment. These templates serve as building blocks for creating a complete application stack. Each template includes the necessary configuration files, deployment scripts, and resource definitions to deploy and manage a particular component of the application stack.

Examples of application stack templates (112) include a web server template that defines the configuration for a web server, such as Apache or Nginx, includes configuration files for server settings, virtual hosts, and SSL/TLS certificates, specifies the required dependencies, such as libraries and modules and/or provides deployment scripts for installing and starting the web server. Another example is a database Template that defines the configuration for a database server, such as MySQL, PostgreSQL, or MongoDB, includes configuration files for database settings, user accounts, and access controls, specifies the required dependencies, such as database drivers and connection libraries, and/or provides deployment scripts for initializing the database and applying schema migrations. Another example is an application server template that defines the configuration for an application server, such as Apache Tomcat or JBoss, includes configuration files for server settings, deployment descriptors, and resource allocations, specifies the required dependencies, such as Java runtime and application libraries and provides deployment scripts for deploying and starting the application server. Another example is a Message Queue Template that defines the configuration for a message queue system, such as RabbitMQ or Apache Kafka, includes configuration files for queue settings, topics, and consumer groups, specifies the required dependencies, such as message broker libraries and drivers and provides deployment scripts for setting up and configuring the message queue system. Another example is a Caching Template that defines the configuration for a caching service, such as Redis or Memcached, includes configuration files for cache settings, eviction policies, and persistence options, specifies the required dependencies, such as caching libraries and drivers, and provides deployment scripts for initializing the cache and configuring cache clients. Another example is a Monitoring Template: that defines the configuration for a monitoring stack, such as Prometheus and Grafana, includes configuration files for data collection, alerting rules, and dashboard templates, specifies the required dependencies, such as exporters and data visualization libraries, and provides deployment scripts for setting up the monitoring infrastructure and configuring data sources. These are just a few examples of application stack templates (112) that can be included in the system. The specific templates used will depend on the requirements of the application environment being deployed. The system allows users to select and combine these templates to create a complete application stack that meets their specific needs. The system may allow users to define and create new templates to create additional application stacks that meets their specific needs. By providing a range of pre-configured templates, the system simplifies the process of defining and deploying application stacks. Users can choose the templates that match their application requirements, customize them as needed, and combine them to create a fully-functional application environment. This reduces the need for manual configuration and scripting, and allows users to quickly and easily deploy complex application stacks in a containerized environment.

The application stack templates (112) are optionally provided in a common syntax such as Cookie cutter. The use of a common syntax like Cookie cutter for the application stack templates allows creating templates and managing them managed in a consistent manner. This standardization makes it easier for users to understand and work with the templates, regardless of their specific application or use case. The use of a common syntax like Cookie cutter for the application stack templates allows for the creation of generic templates that can be easily customized for specific applications or environments. This reusability saves time and effort, as users can start with a pre-existing template and make modifications as needed, rather than creating each template from scratch. The use of a common syntax like Cookie cutter for the application stack templates support the use of variables and parameters, which makes them highly flexible and adaptable. Users can define variables within the templates that can be dynamically populated with specific values based on the metadata dataset or user input. This parameterization allows for the creation of highly customized application stacks without the need for extensive manual configuration. The use of a common syntax like Cookie cutter for the application stack templates can be used to generate not just configuration files, but also source code, test scripts, and documentation. This capability allows for a high degree of automation in the application development process, reducing the amount of manual coding required and increasing overall efficiency as described below.

The application stack templates (112) maybe defined be users. For instance, FIG. 2C is a screenshot of a window for defining an application stack templates (112). FIG. 2D is an exemplary application boilerplate created from a Cookie cutter template formed using the window for defining an application stack templates (112). It uses a templating system to replace or customize folder and file names, as well as file content.

As indicated above, the storage stores metadata datasets (150) that describes the configuration, parameters, and/or settings of each application in the containerized environment. This metadata is generated by converting the logical graph (140) of application relationships and dependencies into a machine-readable format that can be used to automate the deployment and configuration of the environment. Examples of metadata datasets (150) include one or more of the following:

1. Application Configuration:
    Defines the configuration settings for each application, such as server ports, database connection strings, and logging levels.
    Includes environment-specific settings, such as production versus development configurations.
    Specifies any default values or constraints for configuration parameters.
    Example: Application A has a metadata record with the following configuration:
    SERVER_PORT:8080
    DB_URL:jdbc:mysql://database-b:3306/mydb
    LOG_LEVEL:info
2. Deployment Parameters:
    Defines the parameters and settings used to deploy each application, such as replica counts, resource allocations, and scaling policies.
    Includes information about the container runtime and orchestration platform, such as Kubernetes or Docker Swarm.
    Specifies any deployment constraints or requirements, such as node selectors or affinity rules.
    Example: Application A has a metadata record with the following deployment parameters:
    REPLICAS: 3
    CPU_REQUEST: 500 m
    MEMORY_LIMIT: 1Gi
    DEPLOYMENT_STRATEGY: RollingUpdate
3. Environment Variables:
    Defines the environment variables that should be set for each application container.
    Includes sensitive information, such as database passwords or API keys, that should be securely managed and injected into the container at runtime.
    Specifies any default values or value sources for environment variables.
    Example: Application A has a metadata record with the following environment variables:
    DB_USERNAME: myuser
    DB_PASSWORD: ${secretsmanager:mydb/password}
    API_KEY: ${parameter_store:myapp/api_key}
4. Service Dependencies:
    Defines the dependencies between applications and services, including the names and versions of required services.
    Specifies any configuration or connection details needed to access dependent services.
    Includes information about service discovery and load balancing.
    Example: Application A has a metadata record with the following service dependencies:
    DATABASE_SERVICE: database-b:3306
    MESSAGE_QUEUE_SERVICE: rabbitmq:5672
    CACHE_SERVICE: redis:6379
5. Health Check Configuration:
    Defines the health check endpoints and protocols for each application.
    Specifies the timeout and retry settings for health checks.
    Includes any custom health check logic or scripts.
    Example: Application A has a metadata record with the following health check configuration:
    HEALTH_CHECK_PATH:/healthz
    HEALTH_CHECK_PORT: 8080
    HEALTH_CHECK_TIMEOUT: 5 s
    HEALTH_CHECK_INTERVAL: 30 s
6. Security Configuration:
    Defines the security settings and policies for each application, such as authentication methods, authorization rules, and encryption settings.
    Specifies any security-related dependencies or integrations, such as identity providers or secret management systems.
    Includes information about network policies and firewalls.
    Example: Application A has a metadata record with the following security configuration:
    AUTHENTICATION_METHOD:OAuth2
    AUTHORIZATION_POLICY:RBAC
    SSL_CERTIFICATE: ${secretsmanager:myapp/ssl_cert}
    NETWORK_POLICY: allow from 10.0.0.0/24

These are just a few examples of the types of metadata datasets (150) that can be generated by the system. The specific metadata used will depend on the requirements and complexity of the application environment being deployed. The system uses this metadata to automate the configuration and deployment of each application, and to ensure that the environment is properly set up and secured. By generating detailed and structured metadata datasets (150), the system makes it easier to manage the complexity of a containerized application environment. This metadata can be used to automate many of the manual and error-prone tasks involved in deploying and configuring applications, and to ensure that the environment is consistent and reliable. This can help to reduce the time and effort required to deploy and maintain the environment, and can improve the overall quality and stability of the application stack.

Optionally, the graphical user interface allows users to define a continuous integration/continuous deployment (CI/CD) pipeline for the containerized applications environment. Users can specify the stages of the pipeline, such as build, test, and deploy, along with the associated actions and configurations. The system then integrates the generated containerized applications environment repository with the defined CI/CD pipeline. This integration enables automated building, testing, and deployment of the applications whenever changes are made to the repository. The CI/CD pipeline ensures consistent and reliable deployments, reducing manual effort and minimizing the risk of errors.

Optionally, the system allows users to define scaling policies for one or more applications in the containerized applications environment through the graphical user interface. Users can specify the scaling criteria, such as the number of replicas, CPU usage thresholds, or network traffic patterns. These scaling policies are then included in the containerized applications environment repository. When the applications are deployed, the scaling policies are automatically applied, enabling dynamic scaling of the applications based on the defined criteria. This ensures optimal resource utilization and performance of the applications under varying workload conditions.

Optionally, the graphical user interface provides options for users to define backup and disaster recovery policies for the containerized applications environment. Users can specify the backup frequency, retention period, and storage locations for application data and configurations. They can also define disaster recovery procedures, such as failover to a secondary cluster or region. The system includes scripts or configurations in the containerized applications environment repository to implement these backup and disaster recovery policies. These scripts automate the backup process, ensure data consistency, and enable quick recovery in case of any failures or disasters.

Optionally, the system allows users to specify the target cloud platform for deploying the containerized applications environment through the graphical user interface. Users can choose from popular cloud platforms such as Amazon Web Services (AWS), Google Cloud Platform (GCP), or Microsoft Azure. Based on the selected target platform, the system generates platform-specific deployment files or scripts. These files or scripts include the necessary configurations, APIs, and integrations specific to the chosen cloud platform. This enables seamless deployment of the containerized applications environment to the desired cloud platform, taking into account the platform's specific requirements and best practices.

Optionally, the graphical user interface allows users to define application-specific monitoring and logging configurations. Users can specify the metrics to be collected, log levels, and logging destinations for each application in the containerized applications environment. These configurations are then included in the respective application stack templates. When the applications are deployed, the monitoring and logging configurations are automatically applied. This enables fine-grained monitoring and logging for each application, providing insights into application performance, error diagnostics, and usage patterns.

Optionally, the system allows users to define network policies or traffic rules for communication between applications in the containerized applications environment through the graphical user interface. Users can specify the allowed or denied traffic flows, port ranges, and protocols for inter-application communication. These network policies or traffic rules are then included in the containerized applications environment repository. When the applications are deployed, the network policies are enforced, ensuring secure and controlled communication between the applications. This helps in isolating applications, preventing unauthorized access, and mitigating potential security risks.

Optionally, the graphical user interface provides options for users to define identity and access management policies for the containerized applications environment. Users can specify the authentication and authorization mechanisms, user roles and permissions, and access control rules for the applications. The system includes scripts or configurations in the containerized applications environment repository to implement these identity and access management policies. These scripts integrate with external identity providers, configure authentication endpoints, and enforce access controls based on the defined policies. This ensures secure and controlled access to the applications, protecting sensitive data and resources.

Optionally, the system executes a code and the GUI (130) to handle user-defined components, such as described in FIG. 2B (170). The processors (120) are further configured to receive user-defined components (170) via the graphical user interface (130), for example as described below. These user-defined components (170) may be stored in the storage (110) and included in the subgroup of application stack templates (112) used to generate the containerized applications environment repository (160). This allows users to extend the system with custom components and services that are not included in the default set of application stack templates (112).

Figure 3A:
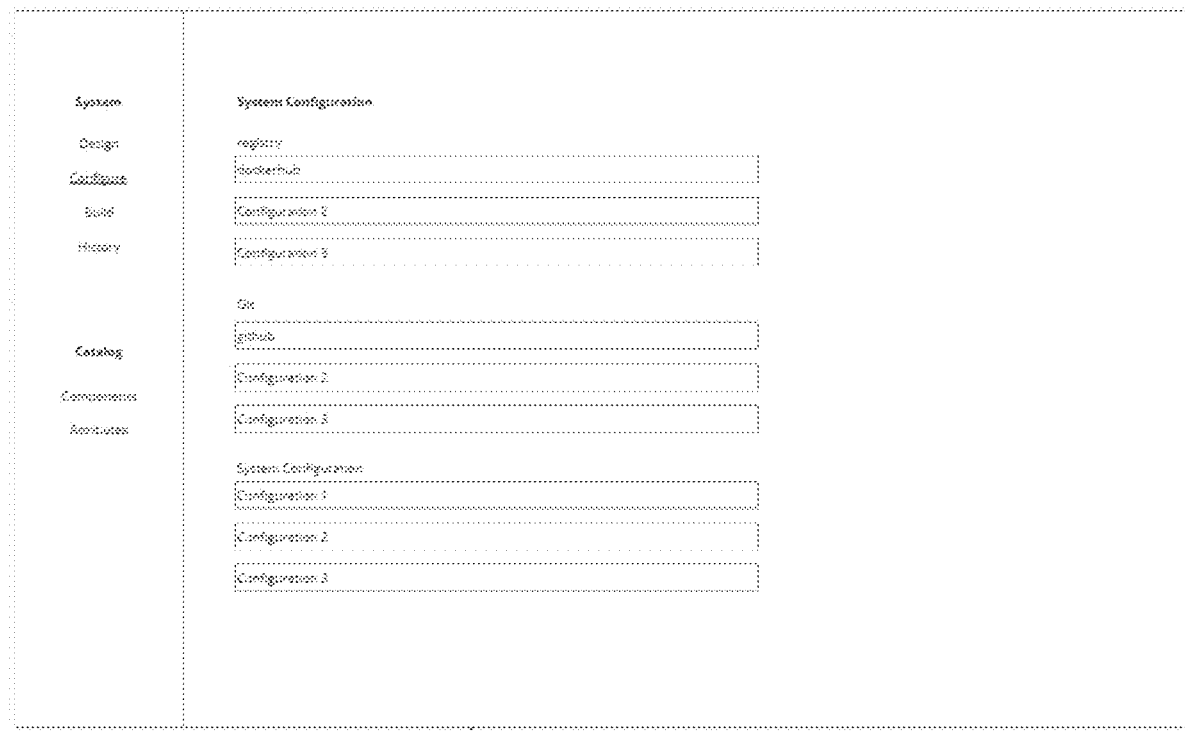
FIGS. 3A-3F are screenshots of a graphical user interface for allowing a user to generate a logic graph, according to some embodiments of the present invention.
Figure 3B:
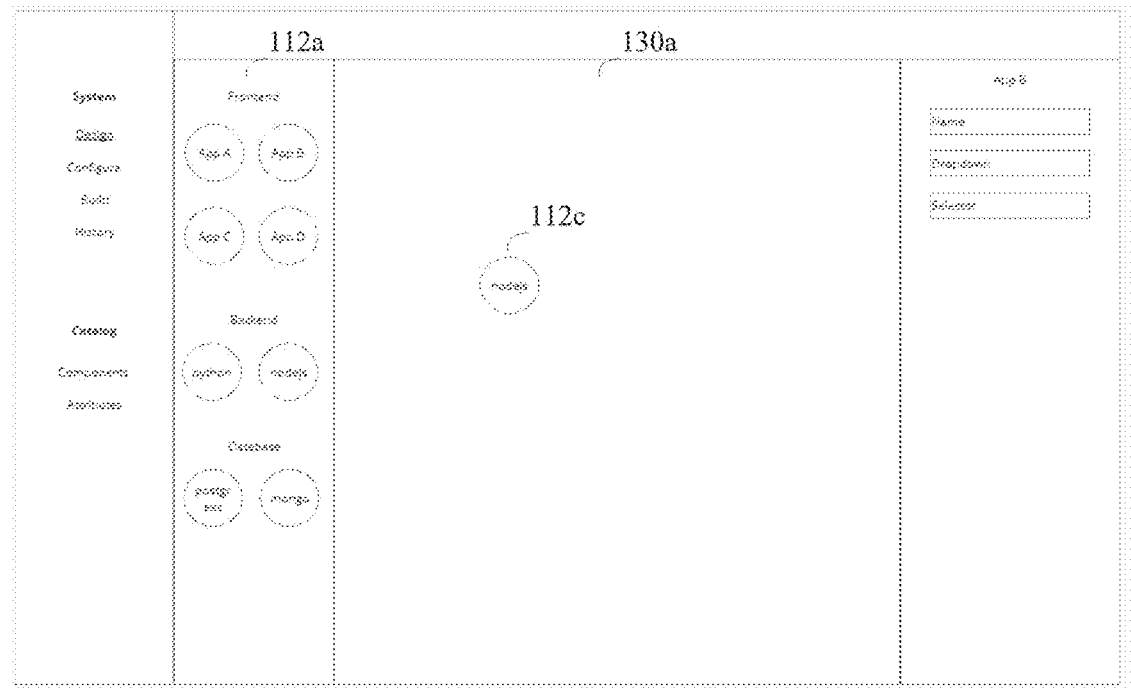
Figure 3C:
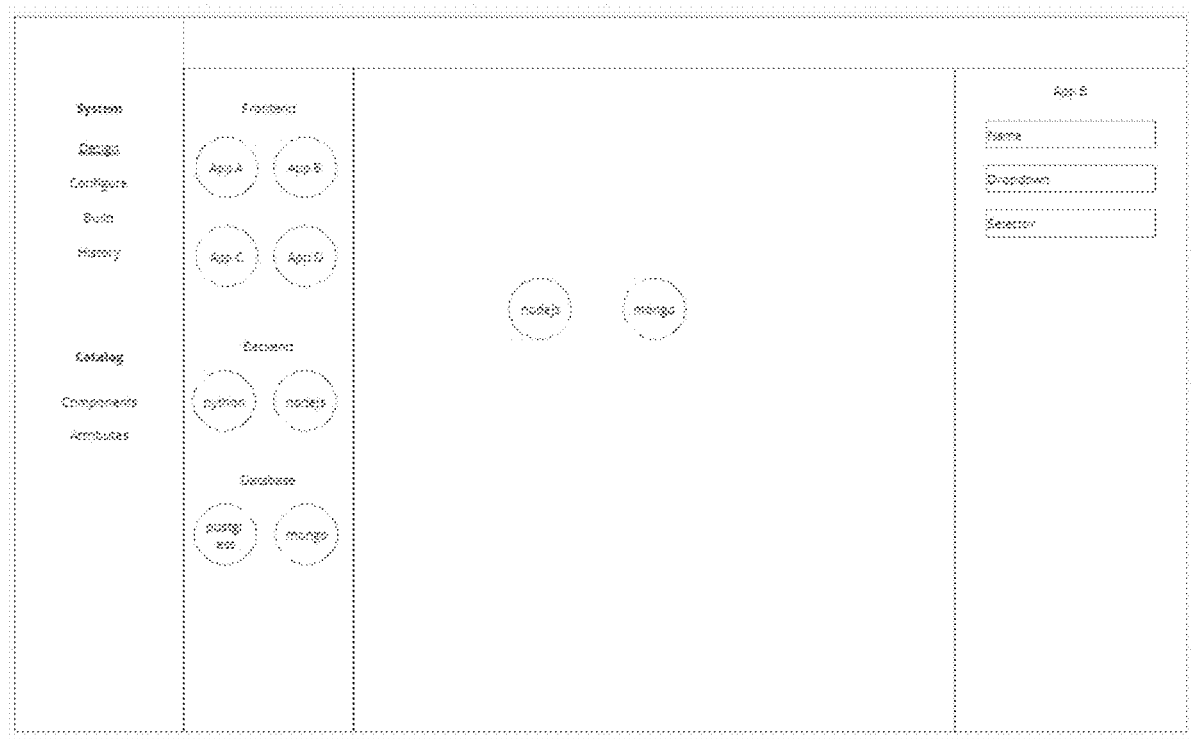
Figure 3D:
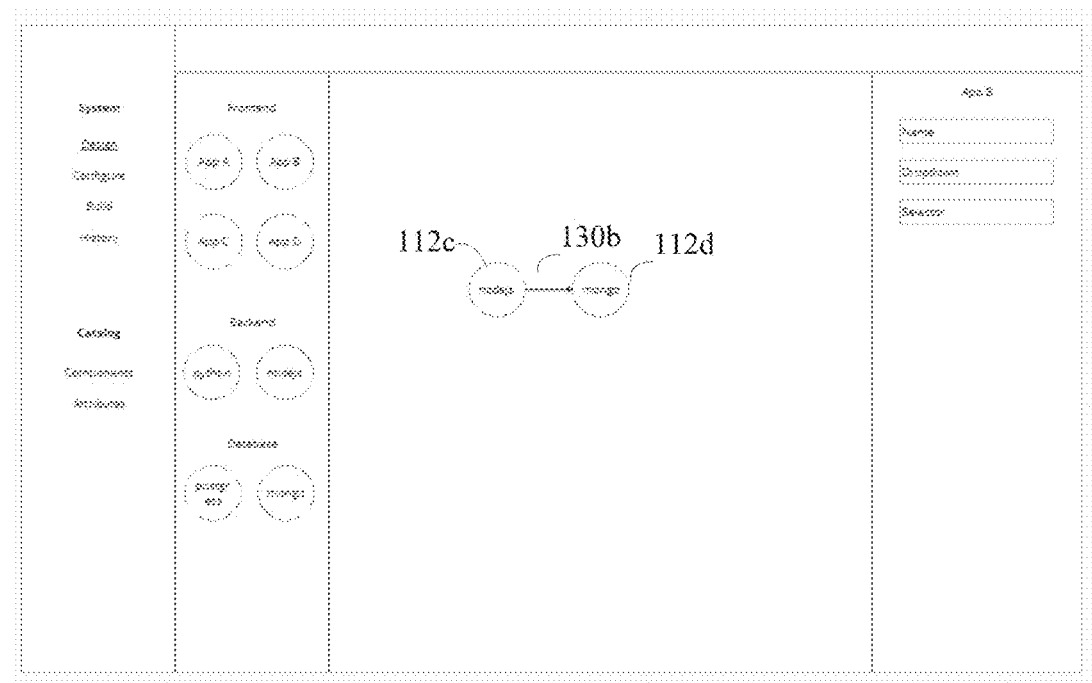
Figure 3E:
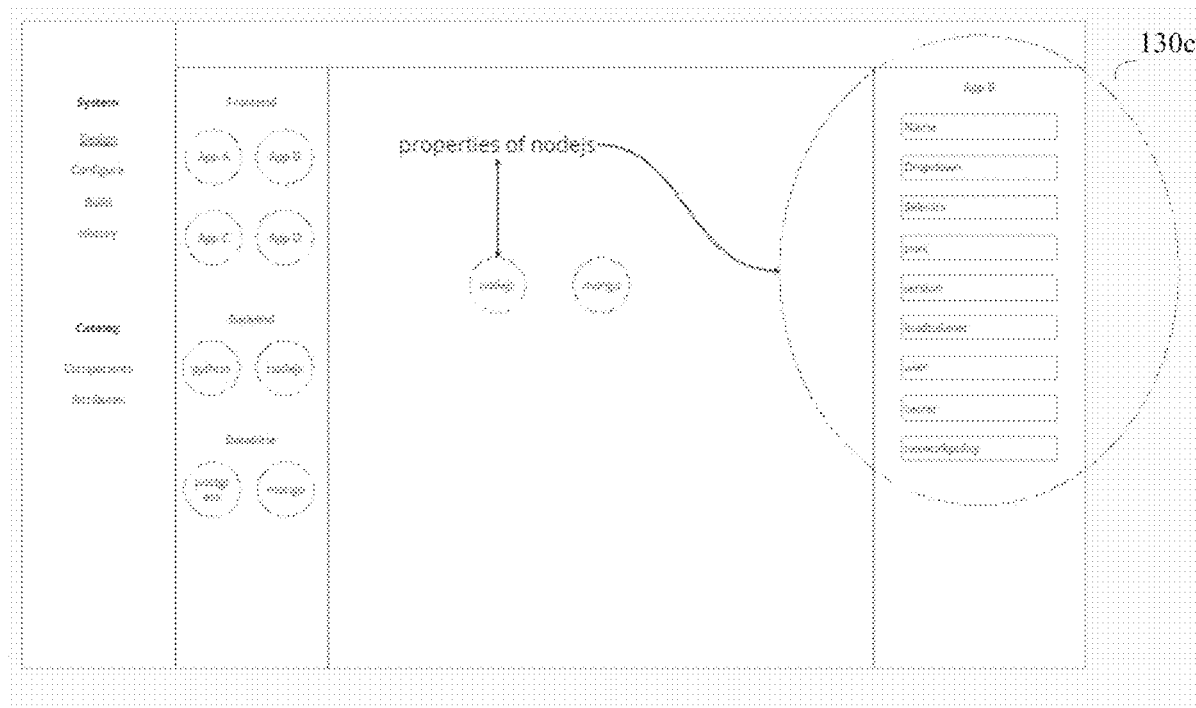
Figure 3F:
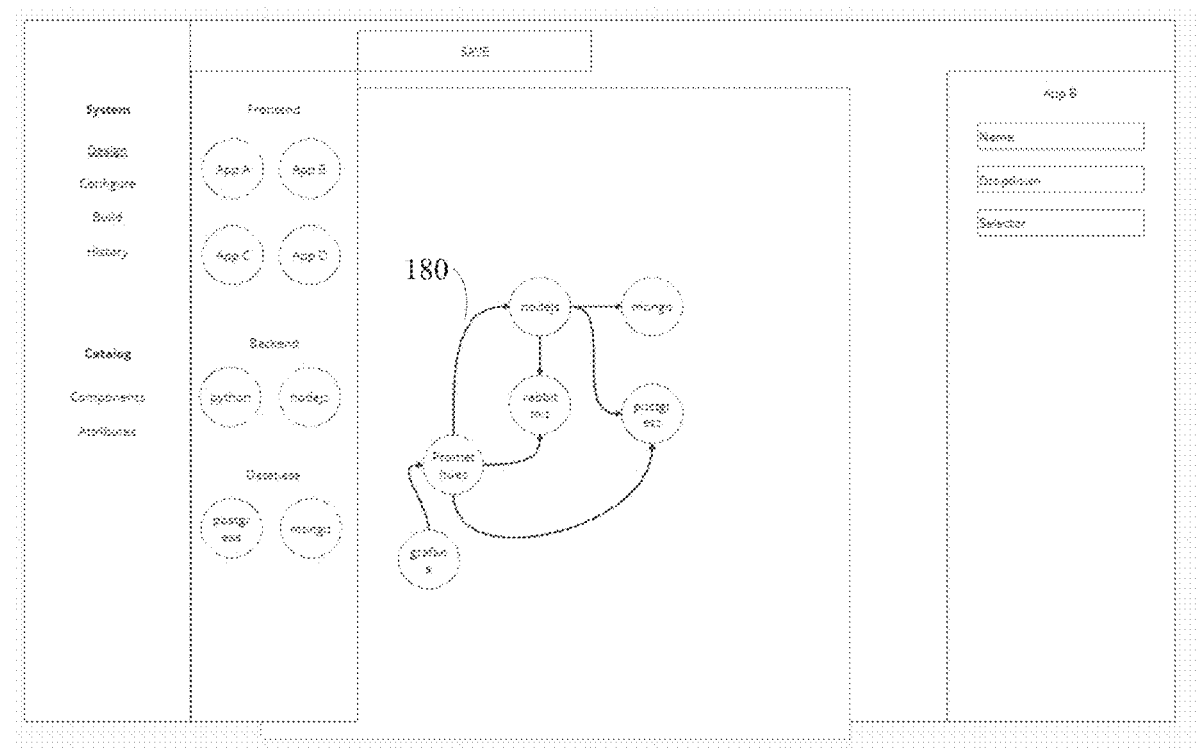

Optionally, the user uses the GUI to handle user-defined links such as depicted in FIG. 3F (180) between applications. The processors (120) are configured to receive user-defined links (180) via the graphical user interface (130). These links (180) specify relationships and data flows between applications that are not included in the default mapping data (114). The processors (120) can update the mapping data (114) with the user-defined links (180) and include them in the logical graph (140) used to generate the metadata dataset (150).

Optionally, the user uses the GUI to define custom attributes such as defined in FIG. 2A (190) for applications. For instance, FIG. 2A is a screenshot of exemplary window for defining attributes. The processors (120) are configured to receive user-defined attributes (190) via the graphical user interface (130). These attributes (190) can be stored in the storage (110) and included in the metadata dataset (150) used to generate the containerized applications environment repository (160). This allows users to specify additional configuration options and parameters for applications beyond those included in the default application stack templates (112).

In addition to generating the containerized applications environment repository (160), the processors (120) may be also configured to generate additional artifacts based on the metadata dataset (150). For example, the processors (120) can generate a set of configuration files for each application in the environment. These configuration files can be included in the containerized applications environment repository (160) and used to configure the applications at runtime.

Similarly, the processors (120) can generate a set of deployment files for the entire containerized applications environment. These deployment files specify how the environment should be deployed to a production system, including any necessary orchestration and scaling parameters. The deployment files can be included in the containerized applications environment repository (160) and used to automate the deployment process.

The system may also include features for handling security policies. The processors (120) are configured to receive user-defined security policies via the graphical user interface (130). These security policies can be stored in the storage (110) and applied to the containerized applications environment repository (160). This allows users to specify security requirements and constraints for the application environment, such as access controls, authentication mechanisms, and encryption settings.

Reference is now made to an exemplary description of the graphical user interface (130) that provides a man machine interface for users to interact with the system and define the desired containerized applications environment. Optionally, the GUI has a drag-and-drop functionality, allowing users to drag and drop icons of applications and to connect therebetween, defining a logic graph that allows selections of templates as described above. This allows intuitive and user-friendly graph creation, allowing users to easily view, manipulate, and configure the various components of the application stack, without needing to write complex configuration files or scripts. For instance, FIG. 2B is a screenshot of exemplary window for defining components.

For example, a user could start by dragging a web server component from a library of available application stack templates (112a) onto the GUI canvas (130a). The user could then drag a database component onto the canvas, and use a connector tool to draw a line such as (130b) between the web server and database components, indicating a dependency relationship.

As the user adds more components to the canvas, the GUI automatically updates the logical graph that represents the relationships and dependencies between the components. The user can rearrange the components on the canvas using drag-and-drop operations, and the logical graph will update accordingly.

The GUI also provides tools for configuring the individual components of the application stack. For example, the user could double-click on a component to open a configuration dialog (130c), which allows the user to specify configuration parameters, deployment settings, and other metadata for the component. The user could also right-click on a component to access context-sensitive menus that provide additional options and actions.

In addition to the drag-and-drop functionality, the GUI also provides other tools and features for interacting with the application stack. For example, the user could use a search tool to find specific components or templates in the library, or use a filtering tool to show only components that meet certain criteria.

The GUI also provides tools for managing the mapping data (114) that defines the relationships and data flows between the components. For example, the user could use a mapping editor (130g) to view and edit the mapping data directly, or use a visual mapping tool to draw connections between components and specify the data flows between them.

Finally, the GUI provides tools for generating and managing the metadata dataset (150) that represents the final state of the application stack. For example, the user could use a metadata editor to view and edit the metadata directly, or use a preview tool to see how the metadata will be used to generate the final containerized applications environment repository (160).

Overall, the graphical user interface (130) provides a powerful and flexible means for users to interact with the system and define the desired state of their containerized applications environment. By providing intuitive drag-and-drop functionality, visual mapping tools, and easy-to-use configuration dialogs, the GUI allows users to quickly and easily compose, configure, and deploy complex application stacks, without needing to write complex configuration files or scripts.

Example of drag-and-drop functionality is provided herein with reference to FIGS. 3A-3F which are exemplary screenshots of the GUI:

1. User opens the GUI (130) and is presented with a blank canvas and a library of application stack templates (112) on the left-hand side. For example, FIG. 3A depicts system configuration window for configuring the environment before opening such a blank canvas. This creates a stack for the environment.
2. User drags a Node.js template (112c) from the library onto the canvas. The GUI displays a new component on the canvas representing the Node.js application. See for example FIG. 3B.
3. User drags a MongoDB template (112d) from the library onto the canvas. The GUI displays a new component representing the MongoDB database. See for example FIG. 3C.
4. User clicks and drags a connector from the Node.js component to the MongoDB component, indicating a dependency relationship. The GUI draws a line between the two components and updates the logical graph (140) to reflect the new relationship. See for example FIG. 3D.
5. User double-clicks on the Node.js component to open the configuration dialog (130c). User enters the desired configuration parameters, such as the application port and environment variables. See for example FIG. 3E.
6. User repeats the process to add more components to the canvas, such as a Redis cache and a message queue. See for example FIG. 3F. Optionally, the user rearranges the components on the canvas by clicking and dragging them to new positions. The GUI updates the logical graph (140) to reflect the new arrangement. The User saves the application stack using a toolbar button (130k). In response to the save, or any other elected que, the metadata dataset (150) is updated. For instance, a metadata dataset (150) representing the final state of the application stack, which can be used to generate a containerized applications environment repository (160) for deployment, is generated or updated. The application stack maybe generated when build is elected by the user.

This example demonstrates how the drag-and-drop functionality of the GUI allows users to quickly and easily compose and configure complex application stacks, without needing to write complex configuration files or scripts. The GUI provides a visual and intuitive way to define the relationships and dependencies between components, and allows users to customize the configuration of each component using simple dialogs and menus. By providing this level of usability and flexibility, the GUI greatly simplifies the process of deploying containerized application environments, and allows users to focus on the high-level design and architecture of their application stack, rather than getting bogged down in the details of low-level configuration and scripting.

According to some embodiments of the present invention, the graphical user interface (130) of embodiments of the present invention is designed to allow users to add their own user-defined components (170) to the library of available application stack templates (112). This functionality enables users to create custom components that meet their specific needs and requirements, and to integrate these components seamlessly into their containerized applications environment.

Example of a process wherein a user-defined component is added to the GUI is exemplified herein with the following steps reference to the following:
1. User clicks on a "Create Custom Component" button in the GUI toolbar. This opens a custom component editor dialog (130*m*).
2. In the custom component editor dialog, the user enters a name and description for the new component, and specifies the type of component (e.g., application server, database, message queue, etc.).
3. User defines the configuration parameters for the component, such as environment variables, port numbers, and other settings. These parameters will be used to customize the behavior of the component at runtime.
4. User specifies the dependencies for the component, such as other components or services that the component requires in order to function properly.
5. User specifies the deployment settings for the component, such as the number of replicas, resource requirements, and scaling policies.
6. User specifies the security settings for the component, such as authentication and authorization requirements, encryption settings, and network policies.
7. User saves the custom component using a "Save" button in the custom component editor dialog. The GUI validates the component definition and adds it to the library of available application stack templates (112).

Once a user-defined component has been added to the library, it can be used in the same way as any other application stack template. The user can drag the component onto the canvas (130*a*), connect it to other components using the connector tool, and configure its settings using the configuration dialog.

When the user saves the application stack, the GUI includes the user-defined component in the generated metadata dataset (150), along with any custom configuration parameters, dependencies, and settings defined by the user.

In addition to creating new user-defined components from scratch, the GUI also allows users to extend and customize existing application stack templates. For example, the user could drag an existing template onto the canvas, and then use the custom component editor dialog to add or modify configuration parameters, dependencies, or other settings. The GUI also provides tools for managing user-defined components, such as a component library manager that allows users to view, edit, and delete custom components, and a version control system that allows users to track changes to custom components over time.

The ability to add and manage user-defined components in the GUI provides a high degree of flexibility and customization for users of embodiments of the present invention. By allowing users to create and integrate their own custom components into the containerized applications environment, the invention enables users to build application stacks that are tailored to their specific needs and requirements, while still benefiting from the automation and governance features provided by the system.

For example, consider a user who needs to deploy a custom application server that requires specific configuration parameters and dependencies. The user could create a new user-defined component for the application server, specifying the required configuration parameters, dependencies, and deployment settings. The user could then drag this custom component onto the canvas (130*a*), connect it to other components such as databases and message queues, and configure its settings using the configuration dialog (130*c*).

When the user saves the application stack, the GUI would generate a metadata dataset (150) that includes the custom application server component, along with any other components and configuration settings defined by the user. This metadata can then be used to generate a containerized applications environment repository (160) that includes the custom application server, along with all the necessary configuration files, deployment scripts, and other artifacts needed to deploy and run the application stack in a containerized environment.

By providing this level of extensibility and customization, the present invention allows users to build and deploy containerized application environments that are tailored to their specific needs and requirements, while still benefiting from the automation, governance, and management features provided by the system.

Figure 4:
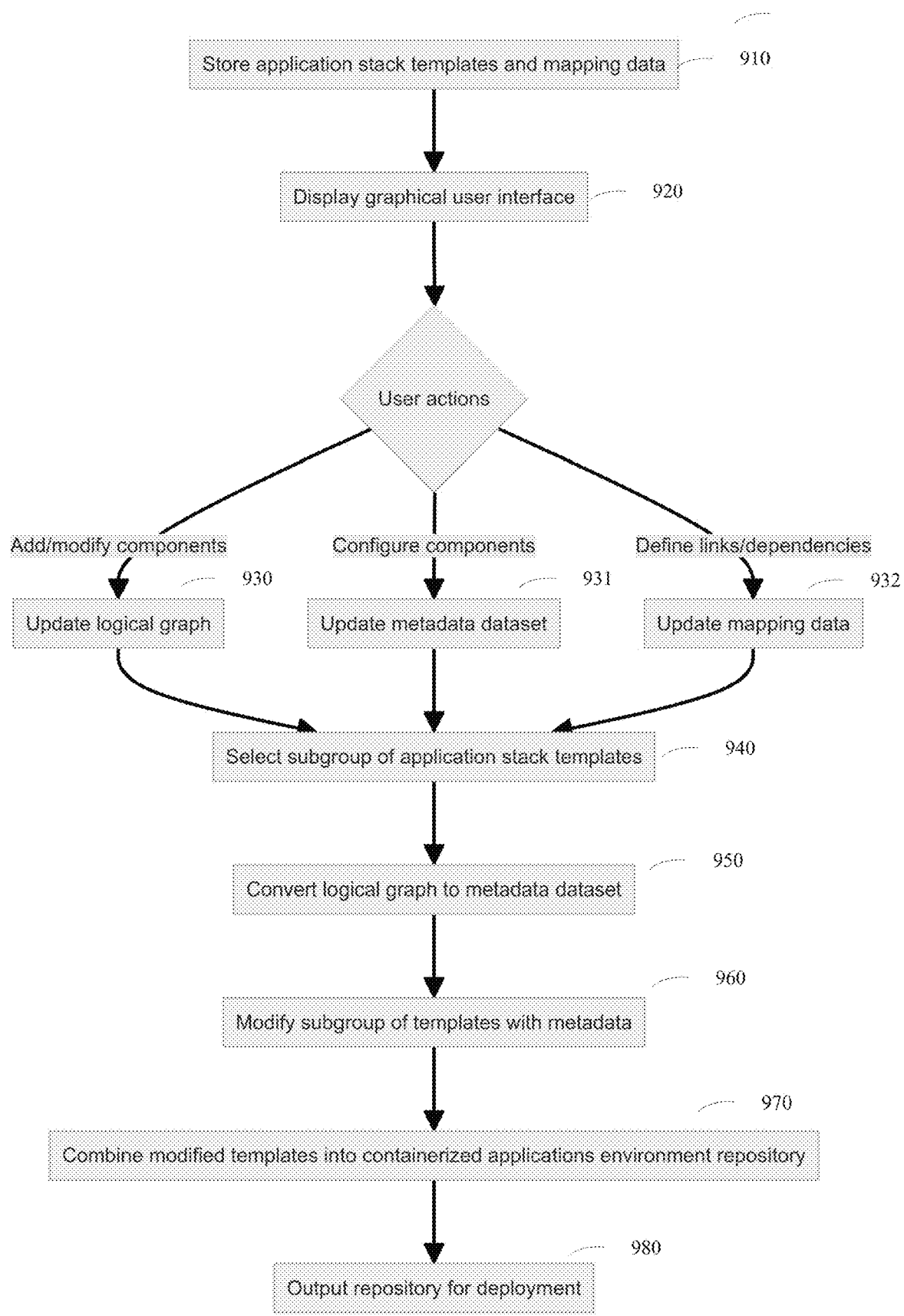
FIG. 4 is a flowchart of a method for generating a containerized applications environment, for instance using the system described with reference to FIG. 1, according to some embodiments of the present invention.

Reference is also made to FIG. 4 which is a flowchart (900) of a method for generating a containerized applications environment, for instance using the system described with reference to FIG. 1, according to some embodiments of the present invention. First, as shown at (910), application stack templates (112) and mapping data (114) is stored in the storage (110) as described above. The application stack templates (112) define the components, services, and dependencies required by each application in the environment, while the mapping data (114) defines the relationships and data flows between the applications. Now, as shown at (920), a graphical user interface (130) is displayed to a user. The graphical user interface (130) allows the user to view and manipulate the application stack templates (112) and mapping data (114), and to define the desired state of the containerized applications environment, for example as described above, for instance by drag and drop actions which connect different applications and the definitions of attributes thereof. Now, as shown at (930), a logical graph (140) is generated based on user actions performed on the graphical user interface (130) and the mapping data (114). The logical graph (140) represents the relationships and dependencies between the applications in the environment, as defined by the user and the mapping data, for example as described above. As shown at 930-932, metadata and mapping data may be updated by the user.

The logical graph (140) represents the relationships and dependencies between the components (112, 170) in the application stack, as for example defined by the user through drag-and-drop actions, connector tools (130*b*), and/or mapping editors (130*g*) in the GUI (130). The logical graph (140) captures the high-level structure and topology of the application stack. To convert the logical graph (140) into a metadata dataset (150), the system (100) may treverse the logical graph (140) and identify the components (112, 170) and their relationships by starting from a root node of the graph and recursively traverse the child nodes where for each node, the corresponding application stack template (112) or user-defined component (170) is identified. For each edge, the type of relationship (e.g., dependency, data flow) and the source and target components are identified. This allows retrieving the configuration parameters and deployment settings for each component as follow:

For each application stack template (112), default configuration parameters and deployment settings from are retrieved from the storage (110) and optionally, for each user-defined component (170), custom configuration parameters and deployment settings specified by the user in the GUI (130) are retrieved. Default and custom parameters and settings, with the custom settings overriding the defaults where applicable are combined. Variable references and dependencies are resolved by identifying variables or placeholders used in the configuration parameters and deployment settings, substituting them with the actual values from the environment, user input, or other sources, and ensuring that the required parameters and settings are properly propagated and shared between the dependent components. This allows generating the metadata dataset (150) by creating a structured representation of the configuration parameters, deployment settings, and other metadata for each component in the application stack, using a standardized format, such as YAML or JSON, to represent the metadata in a machine-readable and human-readable format, organizing the metadata into a hierarchical structure that reflects the relationships and dependencies between the components, as defined in the logical graph (140) optionally including additional metadata, such as version information, timestamps, and authentication tokens, as required by the containerization platform and deployment tools. Optionally the metadata dataset (150) is validated by performing validation checks on the metadata dataset to ensure that it is consistent and/or complete. Optionally the metadata dataset (150) is optimized by removing any redundant or unused parameters and settings and/or compressed to reduce its size and improve transmission and storage efficiency. Once the metadata dataset (150) has been generated, it can be used to modify the subgroup of application stack templates (112) selected based on the logical graph (140). The metadata dataset (150) provides the detailed configuration and deployment information required to customize the templates for the specific application stack defined by the user.

The modified templates (112) can then be combined into a containerized applications environment repository (160), which contains all the necessary configuration files, deployment scripts, and other artifacts required to deploy and run the application stack in a containerized environment. By converting the logical graph (140) into a metadata dataset (150), the system (100) bridges the gap between the high-level, user-friendly representation of the application stack in the GUI (130) and the low-level, machine-readable representation required by the containerization platform and deployment tools. This conversion process enables the system to automatically generate a complete and consistent containerized applications environment repository (160) based on the user's input and configurations, without requiring the user to manually specify all the detailed parameters and settings.

Now, a subgroup of application stack templates (112) is selected based on the applications included in the logical graph (140), as shown at 940. The selected subgroup includes the templates needed to deploy and configure the applications in the environment. Now, as shown at (950), the logical graph (140) is converted into a metadata dataset (150). The metadata dataset (150) includes the configuration parameters, deployment settings, and other metadata needed to deploy and manage each application in the environment. This allows, as shown at (960), to modify the selected subgroup of application stack templates (112) with the metadata from the metadata dataset (150). This step customizes the templates to include the specific configuration and settings needed for each application in the environment. The application stack templates (112) define the basic structure and configuration of the components in the application stack. Placeholders or variables in the templates are replaced with the actual values based on the metadata dataset (150) that contains the specific application parameters and settings for each component in the application stack. To modify the variables in the application stack templates (112) with the respective application parameters from the metadata dataset (150), the system (100) may perform the following:

1. Load the application stack templates (112) and metadata dataset (150):
   Retrieve the subgroup of application stack templates (112) selected based on the logical graph (140) from the storage (110).
   Load the metadata dataset (150) generated from the logical graph (140) into memory.
2. Iterate over each application stack template (112) in the subgroup:
   For each template, identify the component (112, 170) it represents based on the template's name, labels, or other metadata.
   Retrieve the corresponding application parameters and settings from the metadata dataset (150) based on the component's identity.
3. Identify the variables in the application stack template (112):
   Parse the template and identify any placeholders or variables that need to be replaced with actual values.
   Variables may be represented using a specific syntax, such as {{variable_name}}, $variable_name, or % variable_name %, depending on the templating language or framework used.
4. Replace the variables with the respective application parameters:
   For each variable in the template, retrieve the corresponding value from the metadata dataset (150) based on the variable's name and the component's identity.
   If the variable represents a simple value (e.g., a string or number), replace the variable placeholder with the actual value.
   If the variable represents a complex value (e.g., a list or dictionary), serialize the value into a format compatible with the templating language or framework (e.g., YAML or JSON), and replace the variable placeholder with the serialized value.
   If the variable represents a reference to another component or resource (e.g., a database connection string or API endpoint), resolve the reference by retrieving the corresponding value from the metadata dataset (150) and replacing the variable placeholder with the resolved value.
5. Handle default values and conditional logic:
   If a variable in the template has a default value specified, use the default value if no corresponding value is found in the metadata dataset (150).
   If the template includes conditional logic (e.g., if-else statements or loops), evaluate the conditions based on the values from the metadata dataset (150) and include or exclude the corresponding sections of the template accordingly.
6. Validate and format the modified template:
   After replacing all the variables with the respective application parameters, validate the modified template to ensure that it is well-formed and consistent with the templating language or framework's syntax and semantics.
   Format the modified template (e.g., indent the code, add comments, or remove whitespace) to improve its readability and maintainability.
7. Save the modified template:
   Save the modified application stack template (112) to the storage (110) or include it in the containerized applications environment repository (160), depending on the specific implementation and requirements of the system.

By modifying the variables in the application stack templates (112) with the respective application parameters from the metadata dataset (150), the system (100) creates a set of fully configured and customized templates that reflect the specific settings and requirements of the application stack defined by the user.

These modified templates (112) can then be combined with other artifacts, such as deployment scripts, configuration files, and container images, to generate the final containerized applications environment repository (160) that can be used to deploy and run the application stack in a containerized environment.

The process of modifying the variables in the templates (112) with the application parameters from the metadata dataset (150) enables the system (100) to automatically generate a consistent and complete set of artifacts for deploying the application stack, based on the user's input and configurations in the graphical user interface (130). This automation reduces the need for manual editing and configuration of the templates, and helps ensure that the resulting containerized applications environment repository (160) is accurate, up-to-date, and reflective of the user's intent.

As shown at (970), the modified application stack templates (112) are combined into a containerized applications environment repository (160). This is made possible as the used templates, customized with the metadata, are all defined in a common syntax. The repository (160) includes all the files, scripts, and other artifacts needed to deploy and manage the containerized applications environment.

The containerized applications environment repository (160) is a structured collection of files and artifacts that contains everything needed to deploy and run the application stack in a containerized environment, such as Kubernetes or Docker Swarm. The repository (160) will include the modified templates that define the structure and configuration of the components in the application stack, with all variables replaced by the actual application parameters from the metadata dataset (150). The repository (160) may also include deployment scripts that automate the process of deploying the application stack to the target environment, such as Kubernetes manifests, Helm charts, or Docker Compose files. The repository (160) may also include actual executable code and runtime dependencies of the applications in the stack, packaged as container images that can be run in a containerized environment. The repository (160) may also include additional configuration files or settings that are required by the applications or the containerized environment, such as environment variables, secrets, or configmaps.

To combine the one or more members of the subgroup of application stack templates (112) into a containerized applications environment repository (160), the system (100) may perform the following steps:

1. Create the repository structure:
   Create a new directory or repository (160) to store the containerized applications environment artifacts.
   Define a standard structure or layout for the repository (160), based on the conventions and best practices of the target containerization platform or deployment tool.
   Create subdirectories or folders within the repository (160) to organize the different types of artifacts, such as templates, scripts, images, and configuration files.

2. Copy the modified application stack templates (112):
   Retrieve the modified application stack templates (112) that were generated by replacing the variables with the actual application parameters from the metadata dataset (150).
   Copy the modified templates (112) to the appropriate subdirectory or folder within the repository (160), based on the defined structure and layout.

3. Generate the deployment scripts:
   Based on the modified application stack templates (112) and the metadata dataset (150), generate the necessary deployment scripts or configuration files to automate the deployment of the application stack.
   Deployment scripts may include Kubernetes manifests (e.g., Deployments, Services, ConfigMaps), Helm charts, Docker Compose files, or other artifacts, depending on the target containerization platform and deployment tool.
   Ensure that the deployment scripts reference the correct container images, configuration files, and other artifacts within the repository (160).

4. Package the container images:
   For each application in the stack, package the executable code and runtime dependencies as a container image, using tools like Docker or Buildah.
   Ensure that the container images are tagged with the appropriate version or release information, based on the metadata dataset (150) and the user's configurations.
   Store the container images in a container registry or repository, such as Docker Hub, Google Container Registry, or a private registry, depending on the system's requirements and the user's preferences.
   Update the deployment scripts or configuration files to reference the correct container image tags or URLs.

5. Include the configuration files:
   Retrieve any additional configuration files or settings that are required by the applications or the containerized environment, based on the metadata dataset (150) and the user's configurations.
   Copy the configuration files to the appropriate subdirectory or folder within the repository (160), based on the defined structure and layout.
   Update the deployment scripts or templates to reference the correct configuration files or settings.

6. Validate and test the repository:
   Perform validation checks on the containerized applications environment repository (160) to ensure that it is complete, consistent, and well-formed.
   Run automated tests or quality checks to verify that the repository (160) can be successfully deployed and that the application stack functions as expected in a containerized environment.
   If necessary, modify or update the repository (160) based on the results of the validation and testing process.

7. Package and publish the repository:
   Package the entire containerized applications environment repository (160) as a single deployable artifact, such as a tarball, ZIP file, or version control repository (e.g., Git).
   Publish or store the packaged repository (160) in a location that is accessible to the deployment tool or pipeline, such as a version control system, artifact repository, or cloud storage service.

By combining the modified application stack templates (112) and other artifacts into a containerized applications environment repository (160), the system (100) creates a self-contained and deployable unit that encapsulates all the necessary components and configurations to run the application stack in a containerized environment.

The repository (160) serves as the input to the deployment process, which can be triggered manually by the user or automatically by a continuous integration/continuous deployment (CI/CD) pipeline. The deployment process uses the artifacts in the repository (160) to create the necessary resources and configurations in the target environment, such as Kubernetes clusters or Docker Swarm nodes, and to start the application stack.

The containerized applications environment repository (160) provides a consistent and reproducible way to package and deploy the application stack, based on the user's input and configurations in the graphical user interface (130). By automating the process of generating the repository (160), the system (100) reduces the need for manual intervention and ensures that the deployed application stack is always up-to-date and reflective of the user's intent.

This, as shown at (980), allows outputting the containerized applications environment repository (160) for deployment to a production environment. This step makes the repository available for use by a deployment tool or platform, which can use the repository to deploy and manage the containerized applications environment.

The method described above provides a structured and automated approach to deploying containerized application environments. By using a combination of application stack templates (112), mapping data (114), and user input via a graphical user interface (130), the method allows users to define and deploy complex application environments with minimal manual effort. It may be implemented using the system described with reference to FIG. 1, for instance by processors executing a code. The method also includes several sub-steps and variations that can be used to extend and customize the deployment process. For example, the method may include steps for updating the mapping data (114) with user-defined links (180) between applications, or for generating additional configuration files (200) or deployment files (210) based on the metadata dataset (150) as described above. The method may also include steps for applying user-defined security policies (220) to the containerized applications environment repository (160), or for including user-defined components (170) or attributes (190) in the repository.

Overall, the method described above provides a flexible and extensible framework for deploying containerized application environments. By automating many of the manual and error-prone tasks involved in deployment, the method can help to reduce the time and effort required to deploy and maintain complex application stacks, while also improving the consistency and reliability of the deployed environments.

The combination of the system and method described in embodiments of the present invention provides a comprehensive solution for automating the deployment of containerized application environments. By leveraging the power of application stack templates, mapping data, and metadata datasets, the invention enables users to define and deploy complex application stacks with ease, while also providing the flexibility and extensibility needed to customize the deployment process to meet specific needs and requirements.

It is expected that during the life of a patent maturing from this application many relevant hardware components will be developed and the scope of the term processors, storage and containerized application environments is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for enhancing a deployment of a containerized applications environment, comprising:
   a storage comprising a plurality of application stack templates and mapping data mapping application integration topology of a plurality of applications;
   one or more processors configured to:
   instruct, via one or more networks, a display of a graphical user interface using a computing client device;
   based on a plurality of user actions processed by the computing client device and performed on the graphical user interface and the mapping data, generate a logical graph defining a data flow between the plurality of applications;
   select a subgroup of the plurality of application stack templates based on the plurality of applications;
   convert the logical graph into a metadata dataset comprising application parameters of each of at least some of the plurality of applications;

modify variables of one of more members of the subgroup with the respective application parameters;

combine the one of more members of the subgroup to generate a containerized applications environment repository;

generate, based on the containerized applications environment repository, at least one of deployment scripts and configuration files for deploying the containerized applications environment;

output, via the one or more networks, the containerized applications environment repository including the at least one of deployment scripts and configuration files for code production deployment; and deploy the containerized applications environment to a production system using the generated at least one deployment scripts and configuration files, wherein deployed containerized applications environment comprises.

2. The system of claim 1, wherein the application integration topology comprises one or more of:

data flow relationships between the plurality of applications;

security configurations defining one or more of access controls, authentication, and encryption mechanisms for interactions between the plurality of applications; and application dependencies indicating one or more of libraries, frameworks, and services required by each of the plurality of applications.

3. The system of claim 1, wherein the one or more processors are further configured to:

receive, via the graphical user interface, a user-defined component;

store the user-defined component in the storage; and include the user-defined component in the subgroup of the plurality of application stack templates.

4. The system of claim 1, wherein each of the plurality of application stack templates comprises one or more of:

a set of configuration files defining resources and dependencies of a respective application;

a set of deployment files specifying deployment parameters for the respective application; and a set of scripts automating build, test, and deployment processes for the respective application.

5. The system of claim 1, wherein the one or more processors are further configured to:

receive, via the graphical user interface, a user-defined link between two applications;

update the mapping data with the user-defined link; and include the user-defined link in the logical graph.

6. The system of claim 1, wherein the one or more processors are further configured to:

receive, via the graphical user interface, a user-defined attribute for an application;

store the user-defined attribute in the storage; and include the user-defined attribute in the metadata dataset.

7. The system of claim 1, wherein the one or more processors are further configured to:

generate, based on the metadata dataset, a set of configuration files for each of the at least some of the plurality of applications; and include the set of configuration files in the containerized applications environment repository.

8. The system of claim 1, wherein the one or more processors are further configured to:

receive, via the graphical user interface, a user-defined template;

store the user-defined template in the storage; and include the user-defined template in the subgroup of the plurality of application stack templates.

9. The system of claim 1, wherein the one or more processors are further configured to:

generate, based on the metadata dataset, a set of deployment files for the containerized applications environment; and include the set of deployment files in the containerized applications environment repository.

10. The system of claim 1, wherein the one or more processors are further configured to:

receive, via the graphical user interface, a user-defined security policy;

store the user-defined security policy in the storage; and apply the user-defined security policy to the containerized applications environment repository.

11. The system of claim 1, wherein the processors are further configured to:

monitor the deployed containerized applications environment for performance metrics and resource utilization; and generate alerts or notifications when predefined thresholds are exceeded.

12. The system of claim 1, wherein the processors are further configured to:

receive, via the graphical user interface, user input defining a continuous integration/continuous deployment (CI/CD) pipeline for the containerized applications environment; and integrate the containerized applications environment repository with the defined CI/CD pipeline.

13. The system of claim 1, wherein the processors are further configured to:

receive, via the graphical user interface, user input defining scaling policies for one or more applications in the containerized applications environment; and include the defined scaling policies in the containerized applications environment repository.

14. The system of claim 1, wherein the processors are further configured to:

receive, via the graphical user interface, user input defining backup and disaster recovery policies for the containerized applications environment; and include scripts or configurations implementing the defined backup and disaster recovery policies in the containerized applications environment repository.

15. The system of claim 1, wherein the processors are further configured to:

receive, via the graphical user interface, user input specifying a target cloud platform for deploying the containerized applications environment; and generate platform-specific deployment files or scripts based on the specified target cloud platform.

16. The system of claim 1, wherein the processors are further configured to:

receive, via the graphical user interface, user input defining application-specific monitoring and logging configurations; and include the defined monitoring and logging configurations in at least some of the plurality of application stack templates.

17. The system of claim 1, wherein the processors are further configured to:

receive, via the graphical user interface, user input defining network policies or traffic rules for communication between applications in the containerized applications environment; and include the defined network policies or traffic rules in the containerized applications environment repository.

18. The system of claim 1, wherein the processors are further configured to:

receive, via the graphical user interface, user input defining identity and access management policies for the containerized applications environment; and include scripts or configurations implementing the defined identity and access management policies in the containerized applications environment repository.

19. A method for enhancing a deployment of a containerized applications environment, comprising:

storing, in a storage, a plurality of application stack templates and mapping data mapping dataflow relationship between a plurality of applications;

instructing, via one or more networks and by one or more processors, a display of a graphical user interface using a computing client device;

generating, by the one or more processors, a logical graph defining a data flow between the plurality of applications based on a plurality of user actions performed on the graphical user interface and processed by the computing client device and the mapping data;

selecting, by the one or more processors, a subgroup of the plurality of application stack templates based on the plurality of applications;

converting, by the one or more processors, the logical graph into a metadata dataset comprising application parameters of each of at least some of the plurality of applications;

modifying, by the one or more processors, variables of one or more members of the subgroup with respective application parameters;

combining, by the one or more processors, the one or more members of the subgroup to generate a containerized applications environment repository;

generating, based on the containerized applications environment repository, at least one of deployment scripts and configuration files for deploying the containerized applications environment;

outputting, via the one or more networks and by the one or more processors, the containerized applications environment repository including the generated at least one of deployment scripts and configuration files for code production deployment; and deploying the containerized applications environment to a production system using the generated at least one deployment scripts and configuration files, wherein deployed containerized applications environment comprises multiple interconnected containerized applications.

* * * * *